(12) United States Patent
Mori et al.

(10) Patent No.: US 8,528,927 B2
(45) Date of Patent: Sep. 10, 2013

(54) STEERING APPARATUS FOR A VEHICLE

(75) Inventors: Yotaro Mori, Saitama (JP); Mikio Uchiyama, Saitama (JP); Kazuhiko Gogo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 434 days.

(21) Appl. No.: 12/769,209

(22) Filed: Apr. 28, 2010

(65) Prior Publication Data
US 2010/0295266 A1 Nov. 25, 2010

(30) Foreign Application Priority Data

May 22, 2009 (JP) ................................ 2009-124178

(51) Int. Cl.
*B62K 21/02* (2006.01)
*B62K 21/04* (2006.01)
*B62K 21/06* (2006.01)

(52) U.S. Cl.
USPC ........................... 280/279; 280/276; 280/280

(58) Field of Classification Search
USPC ................. 180/219; 280/275, 276, 277, 279, 280/280, 283
See application file for complete search history.

(56) References Cited

U.S. PATENT DOCUMENTS

| | | | |
|---|---|---|---|
| 4,573,698 A * | 3/1986 | Takahashi et al. | 280/279 |
| 5,319,993 A | 6/1994 | Chiang | |
| 5,385,360 A * | 1/1995 | Shook | 280/279 |
| 6,332,625 B1 * | 12/2001 | Fukunaga et al. | 280/280 |
| 7,185,905 B2 * | 3/2007 | Czysz | 280/276 |
| 2005/0206118 A1 * | 9/2005 | Czysz | 280/276 |

FOREIGN PATENT DOCUMENTS

JP 11-165684 A 6/1999

OTHER PUBLICATIONS

KTM, "Owner's Manual 2006", 250 SX-F , pp. 6-10.

* cited by examiner

*Primary Examiner* — Kevin Hurley
*Assistant Examiner* — Marc A Scharich
(74) *Attorney, Agent, or Firm* — Carrier Blackman & Associates, P.C.; Joseph P. Carrier; William D. Blackman

(57) ABSTRACT

A steering apparatus for a vehicle includes a stem pipe disposed in a head pipe by upper and lower bearings interposed therebetween, a seal member for covering the upper bearing, and bottom and top bridges mounted on lower and upper ends of the stem pipe, respectively. A single fastening bolt, having a step formed between a head and a threaded surface thereof, is fitted in a pipe insertion hole of the top bridge and the upper threaded portion of the stem pipe. The stem pipe is firmly tightened and supported by a stem pipe slot-tightening mechanism of the top bridge. The fastening bolt is tightened by only a tightening force required to keep the fastening bolt from loosening. Also, a number of components required for the inventive steering apparatus is reduced, since an additional component, previously used for preventing loosening of a fastening bolt, is made unnecessary.

20 Claims, 6 Drawing Sheets

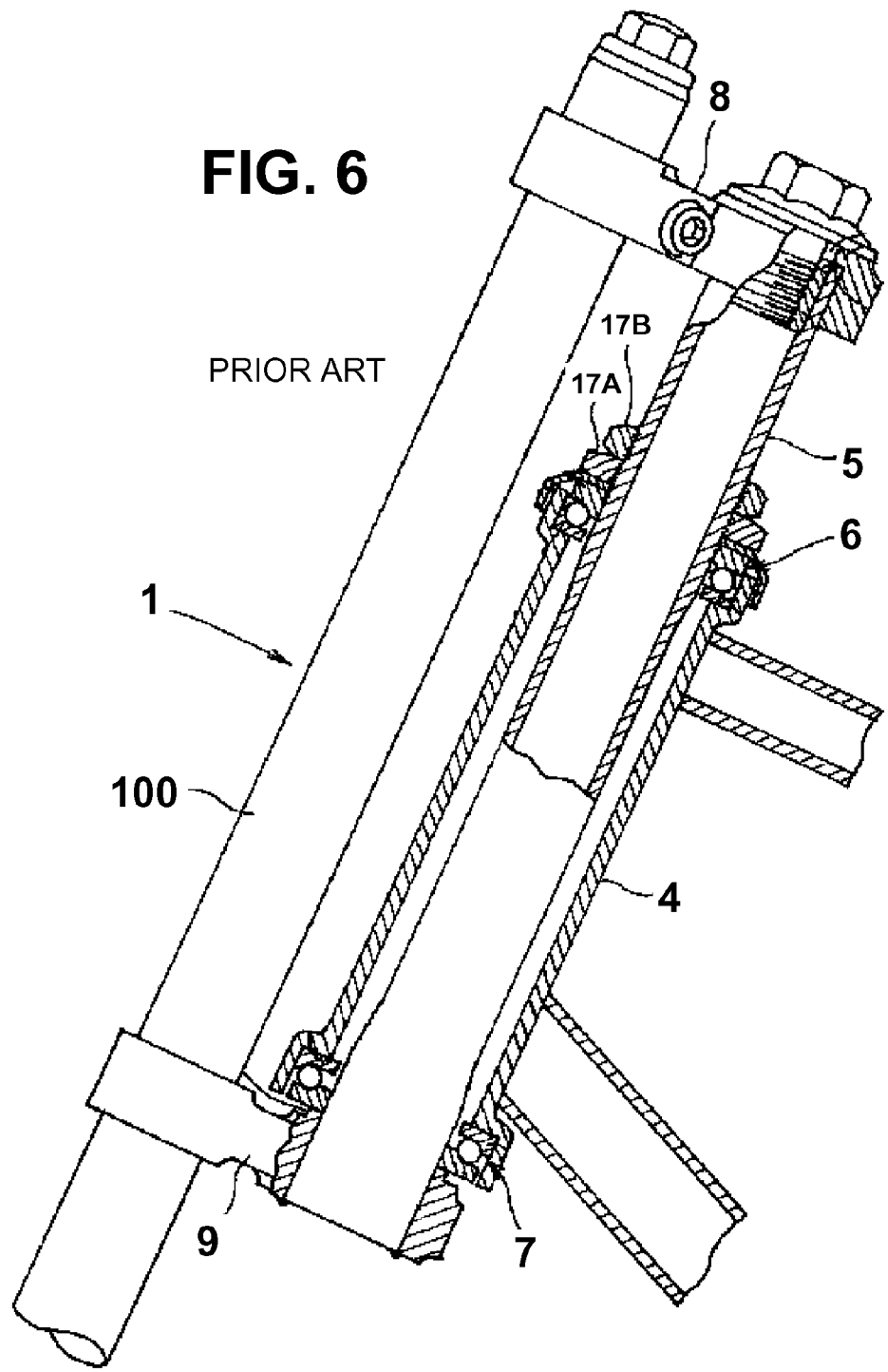

STEERING APPARATUS FOR A VEHICLE

CROSS-REFERENCE TO RELATED APPLICATIONS

The present invention claims priority under 35 USC 119 based on Japanese patent application No. 2009-124178, filed on May 22, 2009. The entire subject matter of this priority document, including specification claims and drawings, is incorporated by reference herein.

BACKGROUND OF THE INVENTION

1. Field of the Invention

The present invention relates to a steering apparatus for a vehicle. More particularly, the present invention relates to a steering apparatus for a vehicle, having a stem pipe pivotally mounted in a head pipe by upper and lower bearings, and secured with a top bridge using a single fastening bolt.

2. Description of the Background Art

There is a known steering apparatus for a vehicle, which has a stem pipe as an essential component thereof pivotally mounted in a head pipe by upper and lower bearings, mounted on the vehicle, such as, a two-wheeled motorcycle or the like. An example of such steering apparatus is disclosed in the Japanese Patent Laid-Open No. Hei 11-165684 (see FIG. 1 thereof, reproduced herein as FIG. 6 of the present application).

As shown in FIG. 6 of the drawings (corresponding to FIG. 1 of Japanese Patent Laid-Open No. Hei 11-165684), one example of a known steering system (1) includes a stem pipe (5) inserted in a head pipe (4) with upper and lower bearings (6, 7) interposed therebetween. A bottom bridge (9) is coupled to a lower portion of the stem pipe (5), and a top bridge (8) is coupled to an upper portion of the stem pipe (5). A front fork (100) is attached to the top bridge (8) and the bottom bridge (9).

The upper bearing (6) is preloaded by an axial force that is applied from above by a nut (17A). Since the nut (17A) tends to loosen due to vibrations, etc., such loosening of the nut (17A) is prevented by an axial force applied thereto by a locking nut (17B). Such conventional locking structure with two nuts (17A, 17B) is called a double nut structure.

Although the double nut locking structure disclosed in the Japanese Patent Laid-Open No. Hei 11-165684 is widely used, such locking structure is made up of many components because such locking structure requires the two nuts (17A, 17B).

In order to install the two nuts (17A, 17B), a sufficient length from the upper bearing (6) to the top bridge (8) is required, resulting in a longer distance by which the stem pipe (5) projects from the upper bearing (6). Therefore, external forces in directions perpendicular to the axis are applied to the upper end of the stem pipe (5) through the top bridge (8). The bending moment on the stem pipe (5) is greater as the external forces are greater. Also, the bending moment on the stem pipe (5) is greater as the distance by which the stem pipe (5) projects from the upper bearing (6) is greater. For reducing the bending stress of the stem pipe to a certain value or smaller, it is necessary to increase the bending rigidity and the wall thickness of the stem pipe (5).

Furthermore, since the stem pipe (5) needs to be externally threaded for installing the two nuts (17A, 17B) thereon, the cost of externally threading the stem pipe to receive such plural nuts is high.

However, small-size vehicles, particularly two-wheeled motorcycles, are required to be made up of a reduced number of components. Also, the two-wheeled motorcycles generally include a stem pipe having a reduced wall thickness.

The present invention has been made to overcome such drawbacks of the known steering apparatus. Accordingly, it is one of the objects of the present invention to provide a steering apparatus for vehicle which is made up of a reduced number of parts, and which includes a stem pipe having a reduced wall thickness.

SUMMARY OF THE INVENTION

In order to achieve the above objects, the present invention according to a first aspect thereof provides a steering apparatus for a vehicle. The steering apparatus includes a stem pipe pivotally mounted in a head pipe by upper and lower bearings, the stem pipe having an internally threaded surface extending axially in an upper portion thereof, a seal member for covering an upper surface of the upper bearing, a bottom bridge mounted on a lower end of the stem pipe, a top bridge having a pipe insertion hole formed therein through which the stem pipe is inserted, and also having a stem pipe slot-tightening mechanism for adjusting a diameter of the pipe insertion hole, and a fastening bolt threaded in the internally threaded surface of the stem pipe after mounting the top bridge on an upper end of the stem pipe.

The present invention according the first aspect thereof is characterized in that the fastening bolt has a step formed between a head and a threaded surface thereof, that the fastening bolt is fitted in the pipe insertion hole, that the stem pipe is inserted in the head pipe with the upper and lower bearings interposed therebetween, that an upper end of the stem pipe is inserted in the top bridge, and then the fastening bolt is threaded in the internally threaded surface thereby preloading the upper and lower bearings, and that the stem pipe slot-tightening mechanism is operable to reduce a diameter of the pipe insertion hole for fixing the top bridge to the stem pipe and the step of the fastening bolt.

The present invention according to a second aspect thereof provides a steering apparatus for a vehicle. The steering apparatus according to the second aspect includes a stem pipe pivotally mounted in a head pipe by upper and lower bearings, the stem pipe having a threaded surface extending axially in an upper portion thereof, a bottom bridge mounted on a lower end of the stem pipe, a top bridge having a pipe insertion hole formed therein through which the stem pipe is inserted, and a stem pipe slot-tightening mechanism for adjusting a diameter of the pipe insertion hole, and a fastening member threaded to the threaded surface of the stem pipe after mounting the top bridge on an upper end of the stem pipe.

The present invention according to the second aspect thereof is characterized in that the bottom bridge includes a bearing presser member for pressing an inner race of the lower bearing; the top bridge includes a bearing presser member for pressing an inner race of the upper bearing; and the stem pipe is inserted in the head pipe with the upper and lower bearings interposed therebetween. An upper end of the stem pipe is inserted in the top bridge, and then the fastening member is threaded to the threaded surface thereby preloading the upper and lower bearings. The stem pipe slot-tightening mechanism is operable to reduce a diameter of the pipe insertion hole thereby fixing the top bridge to the stem pipe.

The present invention according to a third aspect thereof provides a steering apparatus for a vehicle. The steering apparatus according to the third aspect includes a stem pipe pivotally mounted in a head pipe by upper and lower bearings, the stem pipe having a threaded surface extending axially in an upper portion thereof, a bottom bridge mounted on a lower end of the stem pipe, a top bridge having a pipe insertion hole formed therein through which the stem pipe is inserted, and a stem pipe slot-tightening mechanism for changing a diameter of the pipe insertion hole, and a fastening member threaded to the threaded surface after mounting the top bridge on an upper end of the stem pipe The present invention according to the third aspect thereof is characterized in that the bottom bridge has fork insertion holes formed therein at outer left and right sides thereof. The bottom bridge also has fork slot-tightening mechanisms, each operable to adjust a diameter of the respective fork insertion holes. The top bridge has fork insertion holes formed therein at outer left and right sides thereof. The top bridge also has fork slot-tightening mechanisms, each operable to adjust a diameter of the respective fork insertion holes. A pair of left and right front fork members are fixedly inserted in the fork insertion holes of the bottom bridge and the fork insertion holes of the top bridge.

The present invention according to the third aspect thereof is further characterized in that the bottom bridge has a bearing presser member for pressing an inner race of the lower bearing; the top bridge has a bearing presser member for pressing an inner race of the upper bearing; and the stem pipe is inserted in the head pipe with the upper and lower bearings interposed therebetween, an upper end of the stem pipe is inserted in the top bridge, then the fastening member is threaded to the threaded surface, thereby preloading the upper and lower bearings, and the pipe insertion hole is reduced in a diameter by the stem pipe slot-tightening mechanism, thereby fixing the top bridge to the stem pipe.

The present invention according to a fourth aspect thereof is characterized in that the step of the fastening bolt has a diameter less than an outer diameter of the stem pipe such that the diameter of the step conforms with the outer diameter of the stem pipe when the outer diameter of the stem pipe is reduced under compressive forces applied to the stem pipe upon being tightened by the stem pipe slot-tightening mechanism.

The present invention according to a fifth aspect thereof is characterized in that the internally threaded surface of the stem pipe is spaced upwardly from the lower end of the pipe insertion hole when the steering apparatus is assembled.

The present invention according to a sixth aspect thereof is characterized in that the is reduced under compressive forces applied to the stem pipe upon being tightened by the stem pipe slot-tightening mechanism for reducing the diameter of the pipe insertion hole is positioned in the vicinity of the center in axial directions of the threaded surface of the fastening bolt when the steering apparatus is assembled.

The present invention according to a seventh aspect thereof is characterized in that the top bridge has a downwardly raised bearing presser member for pressing an inner race of the upper bearing.

EFFECTS OF THE INVENTION

According to the first aspect of the present invention, the fastening bolt is threaded into the internally threaded surface on the upper portion of the stem pipe, thereby fixing the top bridge. Since the top bridge is fixed with the step of the fastening bolt by reducing a diameter of the pipe insertion hole with the stem pipe slot-tightening mechanism, the fastening bolt is prevented from loosening. Since no conventional double nut structure is required for assembling the steering apparatus, the number of components required for assembling the steering apparatus is reduced. In addition, as the outer circumferential surface of the stem pipe does not need to be externally threaded, and only required to be internally threaded at an upper inner portion thereof, the cost of the threading process is lowered.

Since according to the present invention, a conventional double nut structure is not required, the top bridge can be positioned closely to the upper bearing, and the distance by which the stem pipe projects from the upper bearing can be reduced. Also, since the bending moment is reduced, the wall thickness of the stem pipe can be reduced.

According to the second aspect of the present invention, since no preloading nut is required to be provided between the upper bearing and the top bridge, the upper bearing and the top bridge can be positioned closely to each other. A length of the stem pipe interconnecting the top bridge and the upper bearing can be shortened, and the bending moment applied to the stem pipe can be reduced. Therefore, since a wall thickness and a length of the stem pipe can be reduced, the weight of the stem pipe can also be reduced.

According to the third aspect of the present invention, similar to the second aspect, since no preloading nut is required to be provided between the upper bearing and the top bridge, the upper bearing and the top bridge can be positioned closely to each other. The stem pipe interconnecting the top bridge and the upper bearing can be shortened, and the bending moment applied to the stem pipe can be reduced. Therefore, since a wall thickness and a length of the stem pipe can be reduced, the weight of the stem pipe can also be reduced.

According to the fourth aspect of the present invention, the stem pipe is firmly tightened and supported by the stem pipe slot-tightening mechanism, and the step is tightened when the stem pipe is reduced in diameter under compressive forces. Only a tightening force required to keep the fastening bolt from loosening is applied to the fastening bolt.

In other words, since the fastening bolt firmly supports the stem pipe which requires a greater tightening force, and the fastening bolt is tightened by only a tightening force required to keep the fastening bolt from loosening, the step of the fastening bolt does not need to be more rigid than necessary.

According to the fifth aspect of the present invention, when the steering apparatus is assembled, the internally threaded surface of the stem pipe is spaced upwardly from the lower end of the pipe insertion hole. Although stresses tend to concentrate on the distal end of the internally threaded surface, since the distal end of the internally threaded surface is spaced upwardly from the lower end of the pipe insertion hole, such a stress concentration can be avoided.

According to the sixth aspect of the present invention, the slot-tightening bolt of the stem pipe slot-tightening mechanism for reducing a diameter of the pipe insertion hole is positioned in the vicinity of the center in the axial directions of the threaded surface of the fastening bolt. When the slot-tightening bolt of the stem pipe slot-tightening mechanism for reducing a diameter of the pipe insertion hole is tightened, a diameter of the pipe insertion hole is reduced thereby causing a reduced diameter of the stem pipe. When the stem pipe is reduced in diameter, the externally threaded surface is strongly fitted over the fastening bolt. Therefore, the fastening bolt is firmly held in place against loosening.

According to the seventh aspect of the present invention, the top bridge has the raised bearing presser member for pressing the inner race of the upper bearing. When the inner race of the upper bearing is pressed by the bearing presser member, the upper bearing is easily preloaded.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 6 is a view of a conventional steering apparatus for a vehicle.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

An illustrative embodiment of the present invention is described below with reference to the accompanying drawings.

Figure 1:
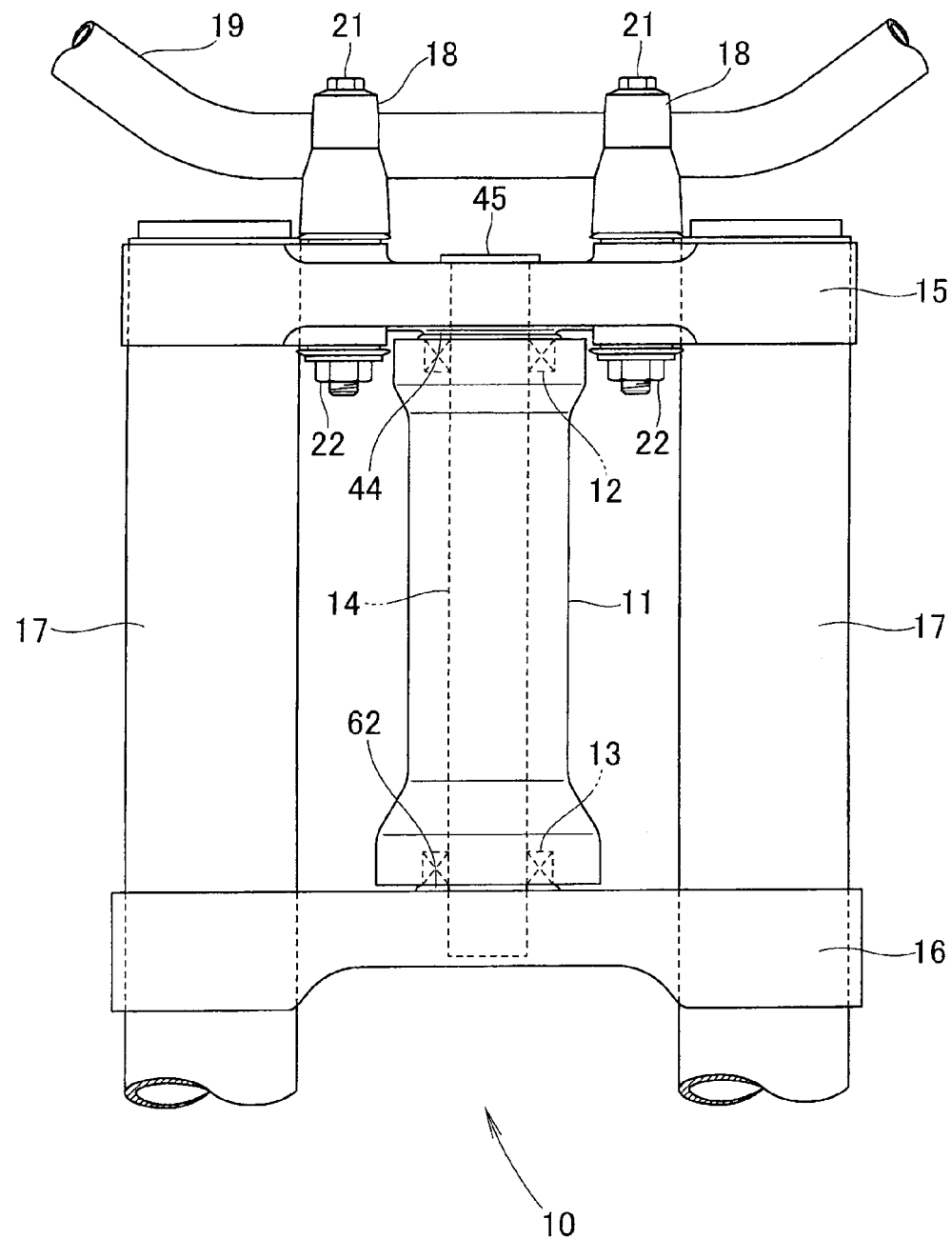
FIG. 1 is a front elevational view of a steering apparatus for a vehicle according to the present invention.

As shown in FIG. 1, a steering apparatus 10 for a vehicle includes a stem pipe 14 pivotally mounted in a head pipe 11 by upper and lower bearings 12, 13. A top bridge 15 and a bottom bridge 16 are mounted respectively on upper and lower ends of the stem pipe 14. Front fork members 17 are mounted on the top bridge 15 and the bottom bridge 16. A steering handle 19 is mounted on the top bridge 15 by handle holders 18. Each of the handle holders 18 is separable into upper and lower parts which are integrally coupled to each other by a bolt 21 and a nut 22.

Figure 2:
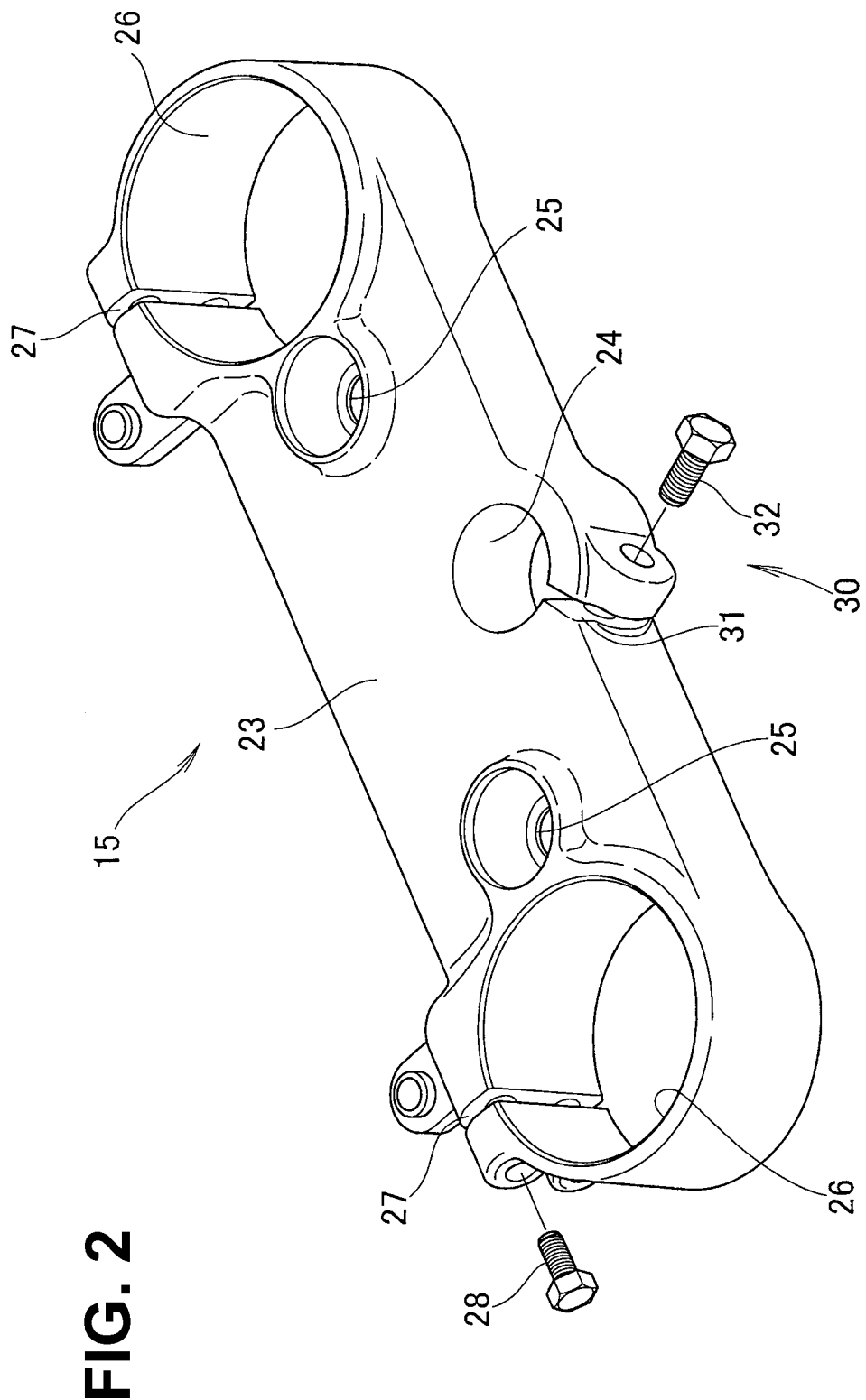
FIG. 2 is a perspective view of a top bridge of the steering apparatus according to the present invention.

As shown in FIG. 2, the top bridge 15 includes a plate-like bridge body 23 having a pipe insertion hole 24 defined centrally therein, bolt insertion holes 25 (holes in which the bolts on the handle holder are inserted) defined in left and right portions of the plate-like bridge body 23, and fork insertion holes 26 defined in the plate-like bridge body 23 outwardly of the bolt insertion holes 25 on their respective left and right sides.

The fork insertion holes 26 have a circular shape partly interrupted by slots 27, and are operable to reduce in diameter by slot-tightening bolts 28 threaded across the slots 27. When the fork insertion holes 26 are reduced in diameter, the front fork members 17 are fastened to the plate-like bridge body 23 of the top bridge 15. In other words, each of the fork insertion holes 26 has a slot-tightening mechanism (fork slot-tightening mechanism) including the slot 27 and the slot-tightening bolt 28.

The central pipe insertion hole 24 also has a slot 31, and is operable to reduce in a diameter by a slot-tightening bolt 32 threaded across the slot 31. In other words, a slot-tightening mechanism (stem pipe slot-tightening mechanism) 30 for reducing the diameter of the pipe insertion hole 24 includes the slot 31 and the slot-tightening bolt 32.

The bottom bridge 16 shown in FIG. 1 is identical in structure to the top bridge 15. Thus, the bottom bridge 16 has the slot-tightening mechanism (stem pipe slot-tightening mechanism) 30, and the slot-tightening mechanism (fork slot-tightening mechanism) including the slot 27.

Figure 3:
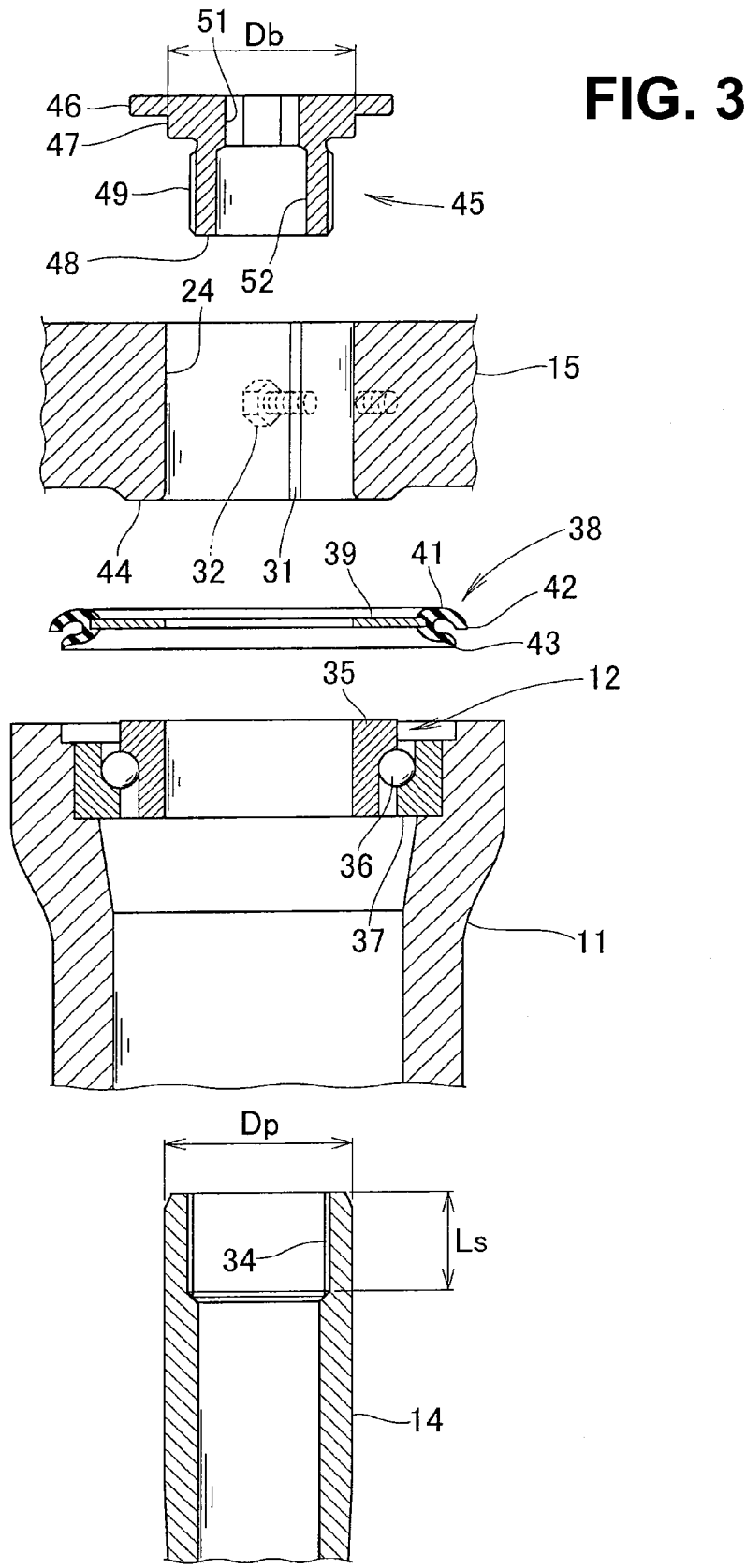
FIG. 3 is an exploded cross-sectional view of the steering apparatus for a vehicle according to the present invention.

The structures of other components of the steering apparatus are described below with reference to an exploded view of the steering apparatus shown in FIG. 3. In FIG. 3, the components of the steering apparatus are described successively upwardly.

As shown in FIG. 3, the stem pipe 14 has an internally threaded surface 34 extending axially in an upper portion thereof. The stem pipe 14 has an outer diameter Dp, and the internally threaded surface 34 has a length Ls.

An upper bearing 12 is mounted in an upper portion of the head pipe 11. The upper bearing 12 includes an inner race 35, steel balls 36 as rolling elements, and an outer race 37. The upper bearing 12 may include an angular ball bearing as shown, or a conical roller bearing, or the like. The upper bearing 12 may be of any type insofar as it can bear a radial load and a thrust load and can be preloaded.

A seal member 38 is interposed between the upper bearing 12 and the top bridge 15. The seal member 38 includes a plate 39 held in contact with the inner race 35 of the upper bearing 12, and a resilient member 41 fitted over an outer circumferential edge of the plate 39. The resilient member 41 includes integral lips 42, 43.

The pipe insertion hole 24 defined in the top bridge 15 has the slot 31, and is associated with the slot-tightening bolt 32. The slot-tightening bolt 32 is positioned substantially at the center of the pipe insertion hole 24 in a vertical direction or slightly above the center of the pipe insertion hole 24 for reasons described later. The top bridge 15 has a downwardly raised bearing presser member 44 on a lower surface thereof for pressing the inner race 35 of the upper bearing 12.

A fastening bolt 45, which is also referred to as a top bolt, includes a head 46 that is sufficiently larger in diameter than the pipe insertion hole 24, a step 47 extending from the head 46 and having a diameter Db that is slightly less than the outer diameter Dp of the stem pipe 14, and a shank 48 extending from the step 47 and having a diameter less than a diameter of the step 47.

The shank 48 of the fastening bolt 45 has an externally threaded surface 49. A tool insertion hole 51 such as a hexagonal hole is defined centrally in the head 46 and the step 47. A blank hole 52 (having a diameter greater than a diameter of the tool insertion hole 51) is formed centrally in the shank 48. A breather tube of a fuel tank or the like can be inserted through the tool insertion hole 51 and the blank hole 52 into the stem pipe 14.

The above components, as discussed with reference to FIGS. 1-3, are shown in an assembled state in FIG. 4.

Figure 4:
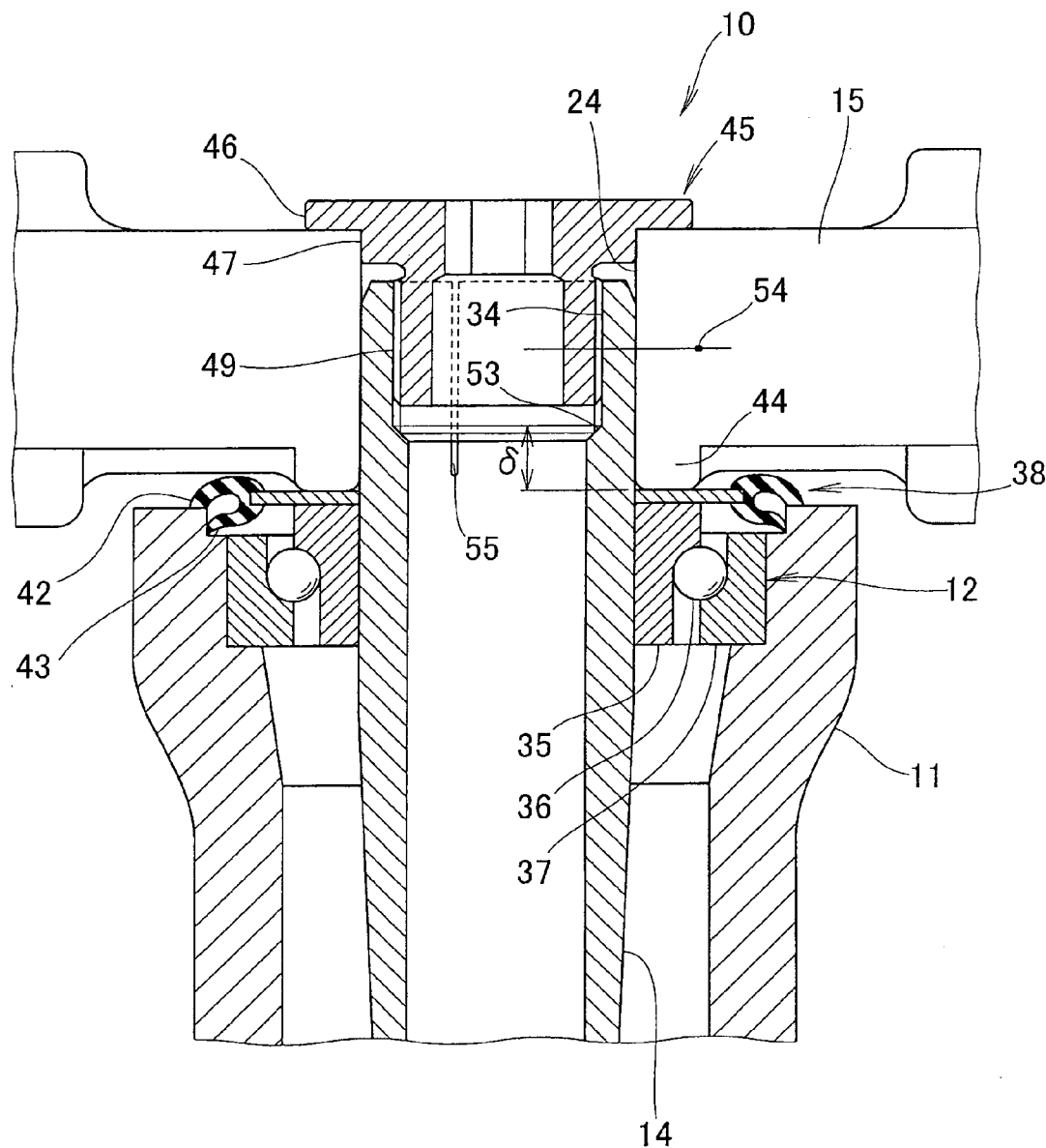
FIG. 4 is a fragmentary cross-sectional view of the steering apparatus for a vehicle according to the present invention.

As shown in FIG. 4, the fastening bolt 45 has the step 47 fitted in the pipe insertion hole 24 between the head 46 and the externally threaded surface 49. The stem pipe 14 is inserted in the head pipe 11 with the upper bearing 12 and the seal member 38 interposed therebetween.

The upper end of the stem pipe 14 is inserted in the top bridge 15, and the fastening bolt 45 is threaded into the internally threaded surface 34 for preloading the upper bearing 12. Specifically, the inner race 35 is depressed into the outer race 37 which remains still for preloading the upper bearing 12.

The stem pipe 14 is firmly tightened and supported by the stem pipe slot-tightening mechanism 30 (see FIG. 2). The step 47 is tightened when the stem pipe 14 is reduced in diameter under compressive forces. Only a tightening force required to keep the fastening bolt 45 from loosening is applied to the fastening bolt 45. In other words, since the fastening bolt 45 firmly supports the stem pipe 14 which requires a greater tightening force and the fastening bolt 45 is tightened by only a tightening force required to keep the fastening bolt 45 from loosening, the step 47 of the fastening bolt 45 does not need to be more rigid than necessary.

It is desirable for the upper portion of the stem pipe 14 to have a slot 55 defined therein which is longer than the internally threaded surface 34. The stem pipe 14 with the slot 55 can be reduced in a diameter thereof more easily when the stem pipe 14 is tightened than if the slot 55 were not defined in the stem pipe 14.

In conventional steering apparatus, a double nut structure has been employed to prevent a bolt from loosening. According to the present invention, since no double nut structure is required, the number of components required for forming the steering apparatus is reduced. In addition, as the outer circumferential surface of the stem pipe 14 does not need to be externally threaded, and only required to be internally threaded, the cost of the threading process is lowered.

According to the present invention, since the conventional double nut structure (e.g., as shown in FIG. 6) is not required, the top bridge can be positioned closely to the upper bearing, and the distance by which the stem pipe projects from the upper bearing can be reduced. Since the bending moment applied to the stem pipe is reduced and the required rigidity of the stem pipe is also reduced, the wall thickness of the stem pipe can be reduced.

As shown in FIG. 4, when the steering apparatus 10 is assembled, the internally threaded surface 34 of the stem pipe 14 is spaced upwardly from the lower end of the pipe insertion hole 24 by a distance 6. Although stresses tend to concentrate on the distal end (starting thread 53) of the internally threaded surface 34, since the distal end of the internally threaded surface 34 is spaced upwardly from the lower end of the pipe insertion hole 24 by the distance 6, such a stress concentration can be avoided.

A line passing through the center in axial directions of the externally threaded surface 49 of the fastening bolt 45 is defined as a central line 54. The slot-tightening bolt 32 (see FIG. 3) is positioned on the central line 54 or in the neighborhood of the central line 54. When the slot-tightening bolt 32 is tightened, the pipe insertion hole 24 is reduced in diameter, causing the stem pipe 14 to be reduced in diameter. When the stem pipe 14 is reduced in diameter, the internally threaded surface 34 is strongly fitted over the fastening bolt 45. Therefore, the fastening bolt 45 is firmly held in place against loosening.

A plurality of slot-tightening bolts may be used to adjust the torque to finer degrees at vertically spaced positions.

The top bridge 15 has the raised bearing presser member 44 for pressing the inner race 35 of the upper bearing 12. When the bearing presser member 44 presses the inner race 35 of the upper bearing 12, the bearing 12 is easily preloaded. Similarly, as shown in FIG. 1, the bottom bridge 16 has a raised bearing presser member 62 for pressing the inner race of the lower bearing 13. When the raised bearing presser member 62 presses the inner race of the lower bearing 13, the bearing 13 is easily preloaded.

The fastening bolt 45 may be replaced with a fastening nut. Such a modification is described below with reference to FIG. 5. The components shown in FIG. 5 which are identical to those shown in FIG. 4 are denoted by identical reference characters, and are not described in detail.

Figure 5:
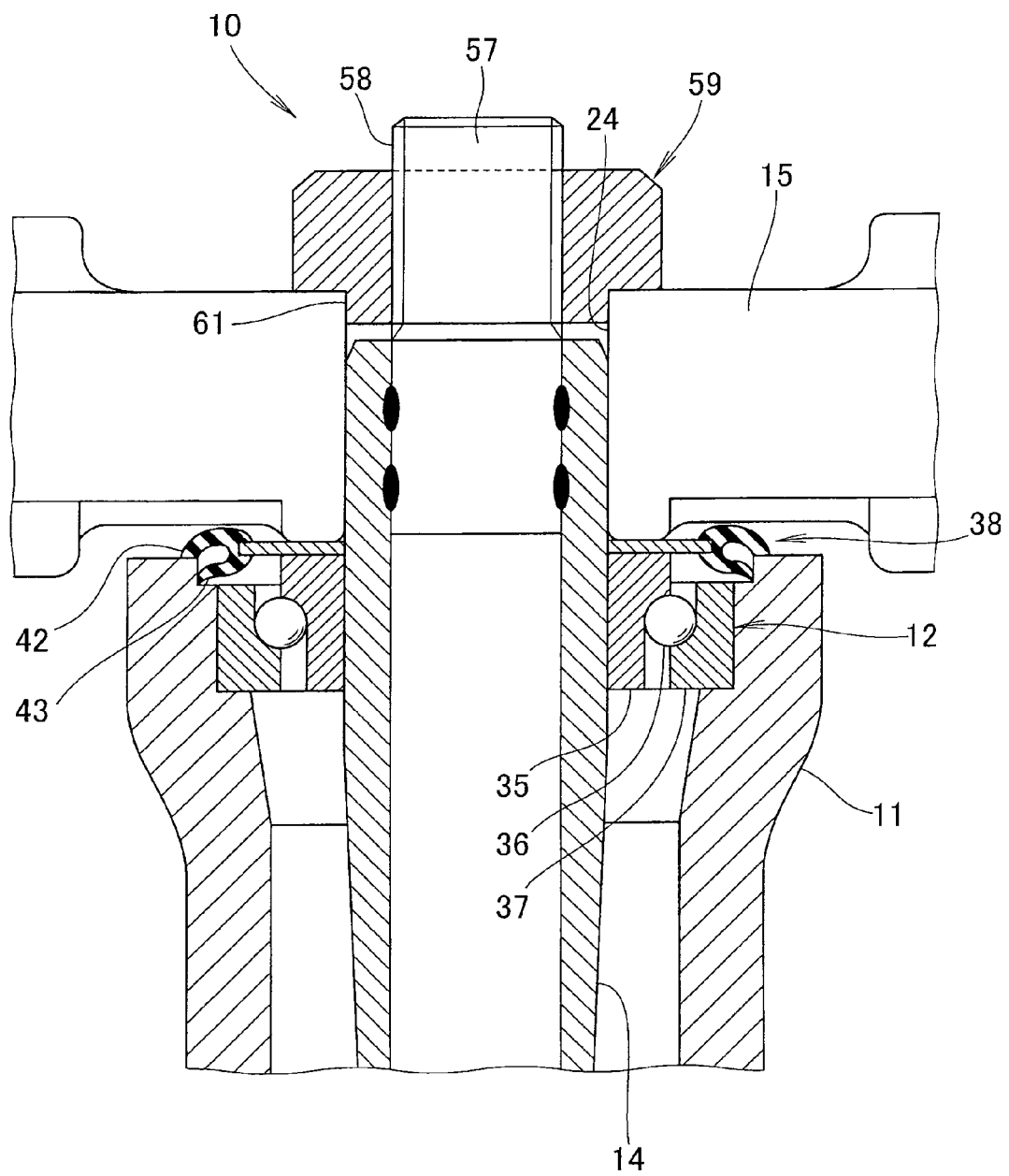
FIG. 5 is a view of a modification of the steering apparatus shown in FIG. 4.

As shown in FIG. 5, a threaded shank 57 is attached to the upper portion of the stem pipe 14. The threaded shank 57 has an externally threaded surface 58. A fastening nut 59 is threaded over the externally threaded surface 58. The fastening nut 59 has a step 61 integral therewith which is inserted in the pipe insertion hole 24.

When the pipe insertion hole 24 is reduced in diameter by the stem pipe slot-tightening mechanism, compressive forces are applied simultaneously to the upper portion of the stem pipe 14 and the step 61 of the fastening nut 59. Since the top bridge 15 is fixed to the stem pipe 14 and holds the step 61 in position under frictional forces generated by the applied compressive forces, the fastening nut 59 will not tend to loosen.

According to the second and third aspects of the present invention, the stem pipe has a "threaded surface" which may be either the internally threaded surface 34 or the externally threaded surface 58. The "threaded surface" tightens a fastening member which may include a member of any kind having an externally threaded surface or an internally threaded surface which corresponds to the "threaded surface," e.g., a bolt or a nut, or any of various other equivalent members.

A slot-tightening mechanism 30 according to the first aspect of the present invention refers to a stem pipe slot-tightening mechanism 30. Another slot-tightening mechanism according to the third aspect of the present invention refers to a fork slot-tightening mechanism.

The vehicle according to the present invention is preferably a two-wheeled motorcycle, but may be a three-wheeled vehicle or a four-wheeled vehicle.

INDUSTRIAL APPLICABILITY

The steering apparatus according to the present invention is preferably applicable to a two-wheeled motorcycle.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A steering apparatus for a vehicle, said steering apparatus comprising:
   a stem pipe pivotally mounted in a head pipe by upper and lower bearings, said stem pipe having an internally threaded surface extending axially on an upper portion thereof;
   a seal member for covering an upper surface of the upper bearing;
   a bottom bridge mounted on a lower end of said stem pipe;
   a top bridge mounted on an upper end of the stem pipe, said top bridge having a pipe insertion hole formed therein through which said stem pipe is inserted, said top bridge comprising an adjustable stem pipe slot-tightening mechanism for adjusting a diameter of the pipe insertion hole; and
   a fastening bolt threaded in said internally threaded surface of the stem pipe after mounting of the top bridge on the upper end of the stem pipe, thereby preloading the upper and lower bearings,
   wherein said fastening bolt has a step formed between a head and a threaded surface thereof, said step of the fastening bolt is fitted in said pipe insertion hole;
   wherein said stem pipe is inserted in said head pipe such that the upper and lower bearings are interposed therebetween; and wherein said stem pipe slot-tightening mechanism is operable to reduce a diameter of the pipe insertion hole, thereby fixing said top bridge to said stem pipe and said step of the fastening bolt.

2. A steering apparatus for a vehicle according to claim 1, wherein in an assembled state of the steering apparatus, said internally threaded surface of the stem pipe is spaced upwardly from the lower end of the pipe insertion hole.

3. A steering apparatus for a vehicle according to claim 2, wherein said stem pipe slot-tightening mechanism for reducing the diameter of said pipe insertion hole is positioned in a vicinity of a center in an axial direction of the threaded surface of said fastening bolt when the steering apparatus is assembled.

4. A steering apparatus for a vehicle according to claim 2, wherein said top bridge has a downwardly raised bearing presser member for pressing an inner race of the upper bearing with only the seal member disposed therebetween.

5. A steering apparatus for vehicle according to claim 1, wherein a diameter of said step of the fastening bolt is less than an unreduced outer diameter of said stem pipe such that said diameter of said step of the fastening bolt conforms with the outer diameter of said stem pipe when the outer diameter of said stem pipe is reduced under compressive forces applied to the stem pipe when tightened by said stem pipe slot-tightening mechanism, and the head of the fastening bolt extends over and engages an upper surface of the top bridge adjacent the pipe insertion hole.

6. A steering apparatus for a vehicle according to claim 5, wherein in an assembled state of the steering apparatus, said internally threaded surface of the stem pipe is spaced upwardly from the lower end of the pipe insertion hole.

7. A steering apparatus for a vehicle according to claim 5, wherein said stem pipe slot-tightening mechanism for reducing the diameter of said pipe insertion hole is positioned in a vicinity of a center in an axial direction of the threaded surface of said fastening bolt when the steering apparatus is assembled.

8. A steering apparatus for a vehicle according to claim 5, wherein said top bridge has a downwardly raised bearing presser member for pressing an inner race of the upper bearing with only the seal member disposed therebetween.

9. A steering apparatus for a vehicle according to claim 1, wherein said stem pipe slot-tightening mechanism for reducing the diameter of said pipe insertion hole is positioned in a vicinity of a center in an axial direction of the threaded surface of said fastening bolt when the steering apparatus is assembled.

10. A steering apparatus for a vehicle according to claim 1, wherein said top bridge has a downwardly raised bearing presser member for pressing an inner race of the upper bearing with only the seal member disposed therebetween.

11. A steering apparatus for a vehicle, said steering apparatus comprising:
a stem pipe pivotally mounted in a head pipe by upper and lower bearings, an upper end of said stem pipe having a threaded surface extending axially thereof;
a bottom bridge mounted on a lower end of said stem pipe;
a top bridge having a pipe insertion hole formed therein, through which said stem pipe is inserted, said top bridge comprising an adjustable stem pipe slot-tightening mechanism for adjusting the diameter of the pipe insertion hole; and
a fastening member threadably mounted to said threaded surface of the stem pipe;
wherein:
said bottom bridge has a bearing presser member for pressing an inner race of the lower bearing;
said top bridge has a bearing presser member for pressing an inner race of the upper bearing;
said stem pipe is disposed in said head pipe with the upper and lower bearings interposed therebetween,
said fastening member is threaded to said threaded surface of the upper end of the stem pipe after the upper end of the stem pipe is inserted to said top bridge, thereby preloading the bearings; and
the pipe insertion hole is reduced in diameter by said stem pipe slot-tightening mechanism thereby fixing said top bridge to said stem pipe.

12. A steering apparatus for a vehicle according to claim 11, wherein said fastening member has a step formed in an outer circumferential surface thereof, a diameter of said step of the fastening member is less than an unreduced outer diameter of said stem pipe such that said diameter of said step of the fastening member conforms with the outer diameter of said stem pipe when the outer diameter of said stem pipe is reduced under compressive forces applied to the stem pipe when tightened by said stem pipe slot-tightening mechanism, a portion of the fastening member including the step is fitted in the pipe insertion hole, and another portion of the fastening member above the step extends over and engages an upper surface of the top bridge adjacent the pipe insertion hole.

13. A steering apparatus for a vehicle according to claim 11, wherein in an assembled state of the steering apparatus, said threaded surface of the stem pipe is spaced upwardly from the lower end of the pipe insertion hole.

14. A steering apparatus for a vehicle according to claim 11, wherein said stem pipe slot-tightening mechanism for reducing the diameter of said pipe insertion hole is positioned in a vicinity of a center in an axial direction of the threaded surface of said fastening member when the steering apparatus is assembled.

15. A steering apparatus for a vehicle according to claim 11, further comprising a seal member for covering an upper surface of the upper bearing, wherein said bearing presser member of the top bridge is downwardly raised for pressing the inner race of the upper bearing with only the seal member disposed therebetween.

16. A steering apparatus for a vehicle, said steering apparatus comprising
a stem pipe pivotally mounted in a head pipe by upper and lower bearings, an upper end of said stem pipe having a threaded surface extending axially thereof;
a bottom bridge mounted on a lower end of said stem pipe, said bottom bridge having fork insertion holes formed in outer left and right sides thereof, and fork slot-tightening mechanisms, associated with respective said bottom bridge fork insertion holes for adjusting the diameters of the respective bottom bridge fork insertion holes;
a top bridge having a pipe insertion hole formed therein through which the upper end of said stem pipe is inserted, said top bridge comprising an adjustable stem pipe tightening mechanism for adjusting a diameter of the pipe insertion hole, fork insertion holes formed in outer left and right sides thereof, and a pair of fork slot-tightening mechanisms, each associated with a respective one of said top bridge fork insertion holes for adjusting diameters of respective said top bridge fork insertion holes,
a fastening member threaded to said threaded surface after mounting the top bridge on the upper end of the head pipe; and a pair of left and right front fork members fixedly inserted in the bottom bridge fork insertion holes of said bottom bridge and the top bridge fork insertion holes of said top bridge;

wherein:

said bottom bridge has a bearing presser member for pressing an inner race of the lower bearing;

said top bridge has a bearing presser member for pressing an inner race of the upper bearing; and said stem pipe is inserted in said head pipe with the upper and lower bearings interposed therebetween, said fastening member is threaded to said threaded surface after the upper end of the stem pipe is inserted in said top bridge, thereby preloading the bearings; and the pipe insertion hole is reduced in diameter by said stem pipe slot-tightening mechanism thereby fixing said top bridge to said stem pipe.

17. A steering apparatus for a vehicle according to claim 16, wherein said fastening bolt has a step formed in an outer circumferential surface thereof, a diameter of said step of the fastening member is less than an unreduced outer diameter of said stem pipe such that said diameter of said step of the fastening member conforms with the outer diameter of said stem pipe when the outer diameter of said stem pipe is reduced under compressive forces applied to the stem pipe when tightened by said stem pipe slot-tightening mechanism, a portion of the fastening member including the step is fitted in the pipe insertion hole, and another portion of the fastening member above the step extends over and engages an upper surface of the top bridge adjacent the pipe insertion hole.

18. A steering apparatus for a vehicle according to claim 16, wherein in an assembled state of the steering apparatus, said threaded surface of the stem pipe is spaced upwardly from the lower end of the pipe insertion hole when the steering apparatus is assembled.

19. A steering apparatus for a vehicle according to claim 16, wherein said stem pipe slot-tightening mechanism for reducing the diameter of said pipe insertion hole is positioned in a vicinity of a center in an axial direction of the threaded surface of said fastening member when the steering apparatus is assembled.

20. A steering apparatus for a vehicle according to claim 16, further comprising a seal member for covering an upper surface of the upper bearing, wherein said bearing presser member of the top bridge is downwardly raised for pressing the inner race of the upper bearing with only the seal member disposed therebetween.

* * * * *